(12) United States Patent
Higashimura et al.

(10) Patent No.: US 6,841,650 B2
(45) Date of Patent: Jan. 11, 2005

(54) CRYSTALLIZABLE POLY(2,5-DI-SUBSTITUTED-1,4-PHENYLENE OXIDE) AND A METHOD OF PREPARING THE SAME

(75) Inventors: Hideyuki Higashimura, Tsukuba (JP); Kiyoshi Fujisawa, Tsukuba (JP); Yoshihiko Moro-Oka, Tokyo (JP); Shiro Kobayashi, Kyoto (JP)

(73) Assignees: National Institute of Advanced Industrial Science and Technology, Tokyo (JP); Japan Chemical Innovation Institute, Tokyo (JP)

( * ) Notice: Subject to any disclaimer, the term of this patent is extended or adjusted under 35 U.S.C. 154(b) by 0 days.

(21) Appl. No.: 10/157,862

(22) Filed: May 31, 2002

(65) Prior Publication Data

US 2002/0183475 A1 Dec. 5, 2002

Related U.S. Application Data

(63) Continuation of application No. 09/496,268, filed on Feb. 1, 2000, now Pat. No. 6,541,596.

(30) Foreign Application Priority Data

Feb. 5, 1999 (JP) .............................. 11-029306
Mar. 19, 1999 (JP) .............................. 11-076886

(51) Int. Cl.$^7$ .............................................. C08G 59/50
(52) U.S. Cl. .................. 528/120; 528/86; 528/482; 528/485; 528/486; 528/492
(58) Field of Search .................. 528/120, 86, 482, 528/485, 486, 492

(56) References Cited

U.S. PATENT DOCUMENTS 5,037,897 A  8/1991  Glans et al.
5,334,444 A  8/1994  Bhoori et al.

FOREIGN PATENT DOCUMENTS

GB          1451695        10/1976

(List continued on next page.)

OTHER PUBLICATIONS

Polymer, 20(8), 995–1002 (1979).
Ecletica Quim., 18, 93–100 (1993).

(List continued on next page.)

*Primary Examiner*—Duc Truong
(74) *Attorney, Agent, or Firm*—Birch, Stewart, Kolasch & Birch, LLP

(57) ABSTRACT

There is disclosed a crystallizable poly(2,5-di-substituted-1,4-phenylene oxide), which exhibits an exothermic peak for crystallization of not less than 5 J/g at 150° C. or over when cooled after melting, and/or an endothermic peak, at the time of melting of crystals thereof, of not less than 5 J/g at 150° C. or over when re-heated after cooling of the melt, and which comprises a recurring unit of the following formula (I), and a method of preparing the same by polymerization of a 2,5-di-substituted-phenol of the following formula (II) by use of a copper complex catalyst made of a tridentate ligand of which nitrogen atoms coordinate to a copper atom in coexistence with oxygen:

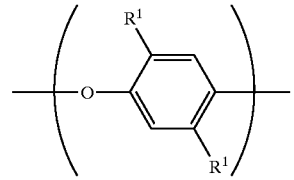

(I)

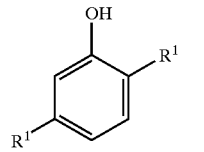

(II)

wherein $R^1$'s independently represent a hydrocarbon group or a substituted hydrocarbon group, and they may be the same or different. The crystallizable poly(2,5-di-substituted-1,4-phenylene oxide) is able to provide a melt molding which has a reduced degree of coloration and good heat resistance.

31 Claims, 6 Drawing Sheets

FOREIGN PATENT DOCUMENTS

| | | |
|---|---|---|
| JP | 47619 B | 1/1972 |
| JP | 4820239 B | 6/1973 |
| JP | 4838640 | 11/1973 |
| JP | 5028999 | 9/1975 |
| JP | 62172024 A | 7/1987 |
| JP | 1045899 A | 2/1998 |
| JP | 1045904 A | 2/1998 |

OTHER PUBLICATIONS

Chem. Prum., 22(9), 451–454 (1972).
Polimery, 14(11), 535–538 (1969).
J. Am. Chem. Soc., 81, 6335–6336 (1959).
Macromolecules, 2, 107–108 (1969).
J. Polym. Sci.: Part A: Polymer Chemistry, 36, 505–517 (1998).
Preprint read on Oct. 8, 1999 in the 48$^{th}$ Symposium on Macromolecules (a symposium held by Society of Polymer Science, Japan), under the lecture No. IIIB12, entitled "Radical–Controlled" Oxidative Polymerization of Phenols. *Polymer Preprints* 2000, 41 (1) XXXX.
Preprint read on Oct. 8, 1999 in the 48$^{th}$ Symposium on Macromolecules (a symposium held by Society of Polymer Science, Japan), under the lecture No. IIIB13, entitled Oxidative Polymerization of 2, 5–Dimetylphenol Catalyzed by Tyrosinase–Model Complex.

J. Am. Chem. Soc., 1998, 120, 8529–8530.

J. Jachowicz et al., Thermal degradation of poly (2–methylphenylene oxide), poly(2, 5–dimethylphenylene oxide) and poly (1, 4–phenylene oxide), POLYMER, vol. 20, pp. 995–1001, XP–000949236, Aug., 1979.

Jan Kotas et al., "Kinetika oxidaeni polykondenzace krezolu a xylenolu", Chemicky Prumysl, vol. 22, No. 9, pp. 451–454, XP–000949385, 1972.

Hideyuki Hiashimura et al., "Highly Regioselective Oxidative Polymerization of 4–Phenoxyphenol to Poly (1, 4–phenylene oxide) Catalyzed by Tyrosinase Model Complexes", J.Am.Chem.Soc., vol. 120, pp. 8529–8530, XP–000946155, 1998.

Hideyuki Higashimura et al.; Applied Catalysis A: General; "'Radical–controlled' oxidative polymerization of o–cresol catalyzed by $\mu$–$\eta^2$ $\eta^2$ –peroxo dicopper (II) complex"; 194–195 (2000) 427–433.

Hideyuki Higashimura et al.; Journal of Molecular Catalysts A: Chemical; "'Radical–controlled' oxidative polymerization of m–cresol catalyzed by $\mu$–$\eta^2$ :$\eta^2$ –peroxo dicopper (II) comples"; 155 (2000) 201–207.

Encycl. Polym. Sci. Technol., 10:92–111 (1969).

Fig. 1  Comparative sample 101  (DSC, Cooling)
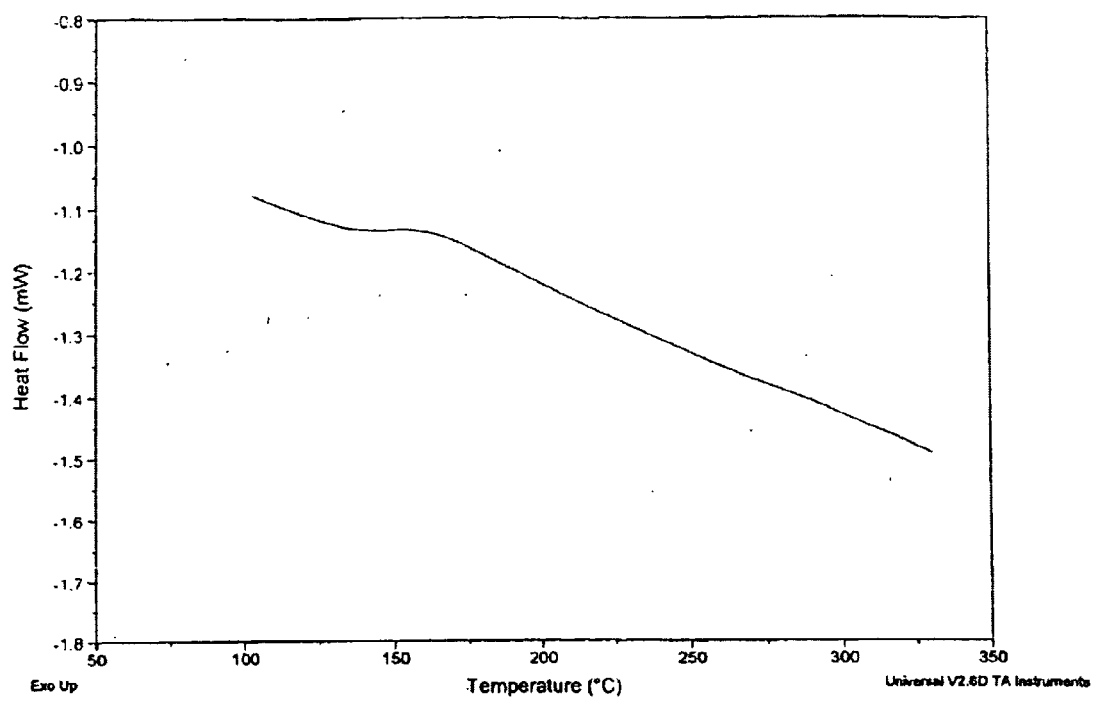
Fig. 2  Comparative sample 101  (DSC, 2nd-heating)
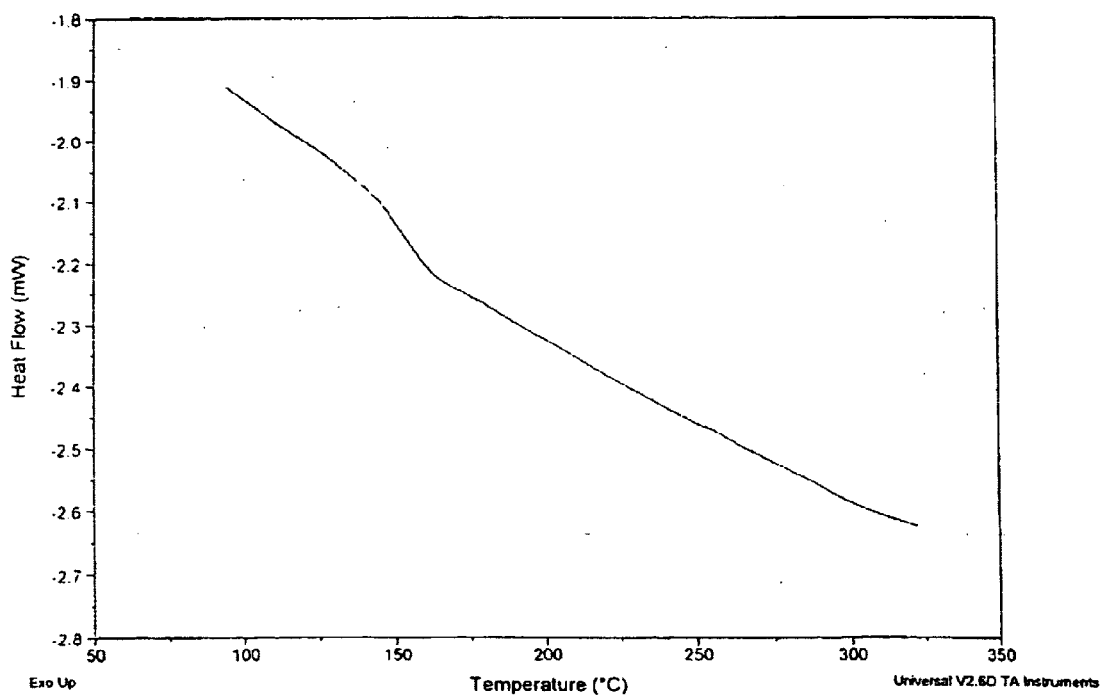

Fig. 3  Comparative sample 102  (DSC, Cooling)
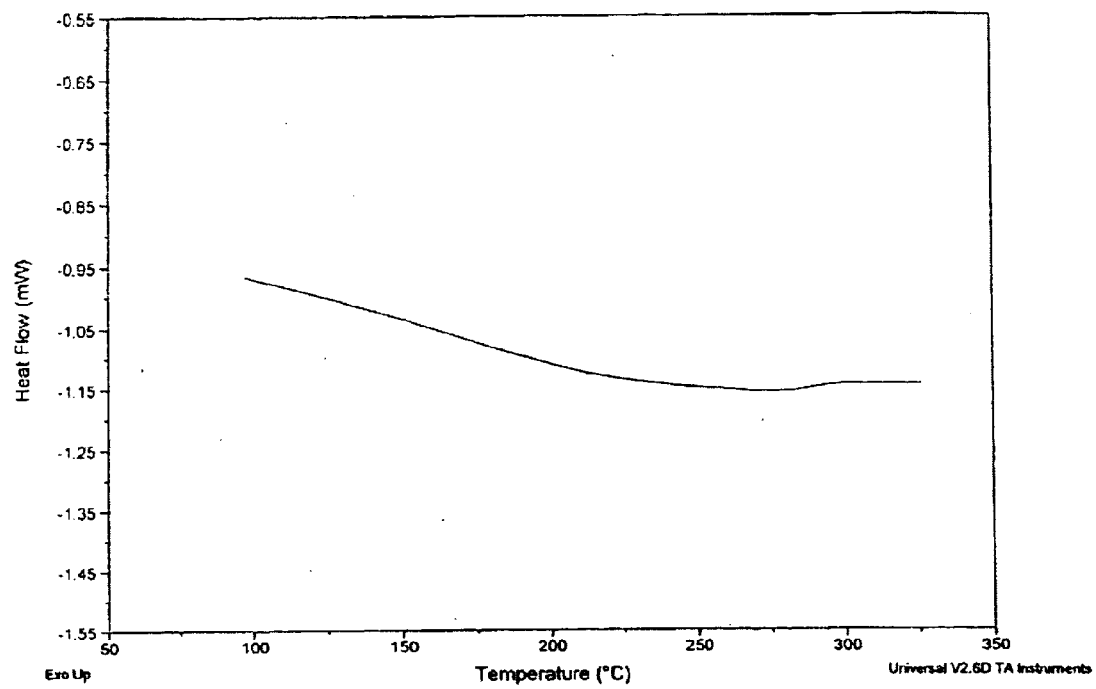
Fig. 4  Comparative sample 103  (DSC, 2nd-heating)
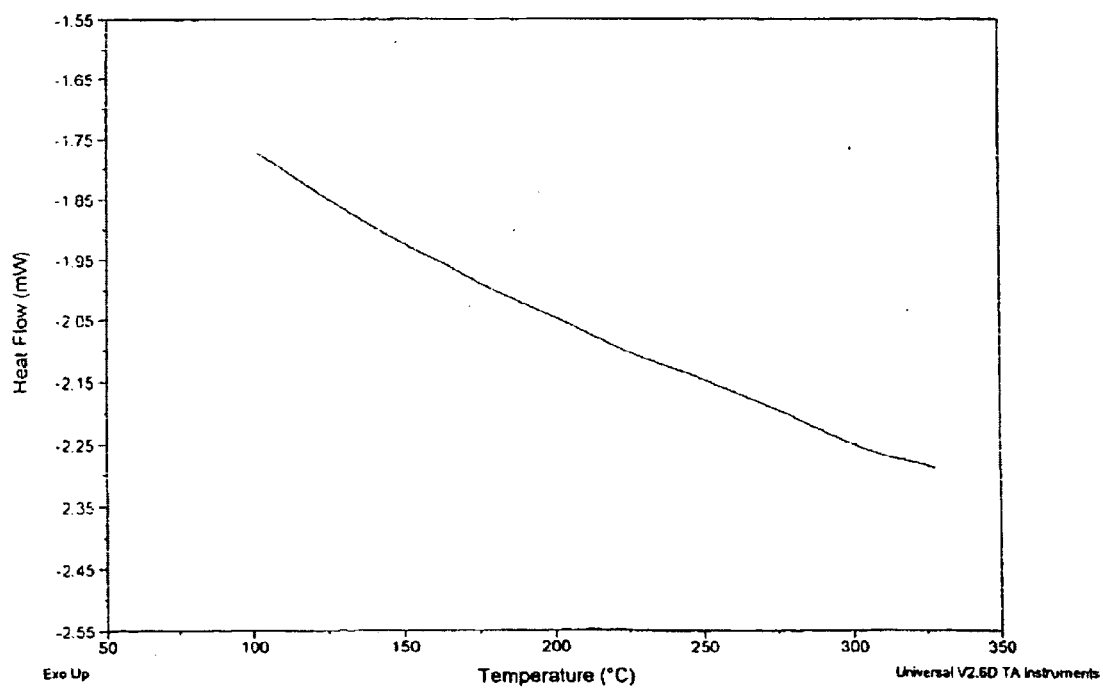

Fig. 5  Comparative sample 103  (DSC, Cooling)
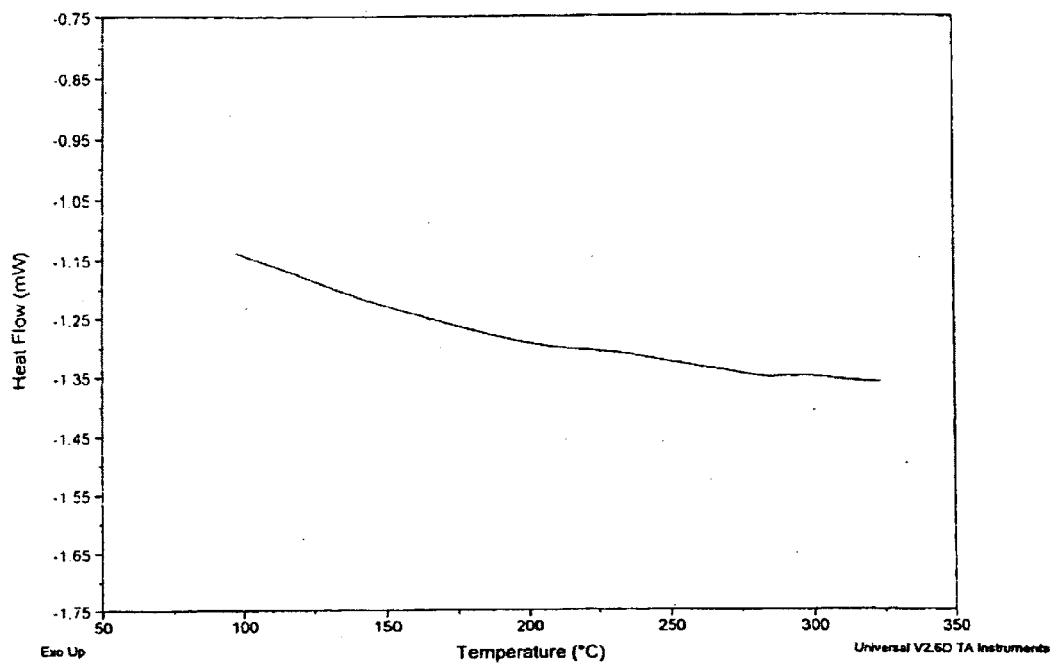
Fig. 6  Comparative sample 103  (DSC, 2nd-heating)
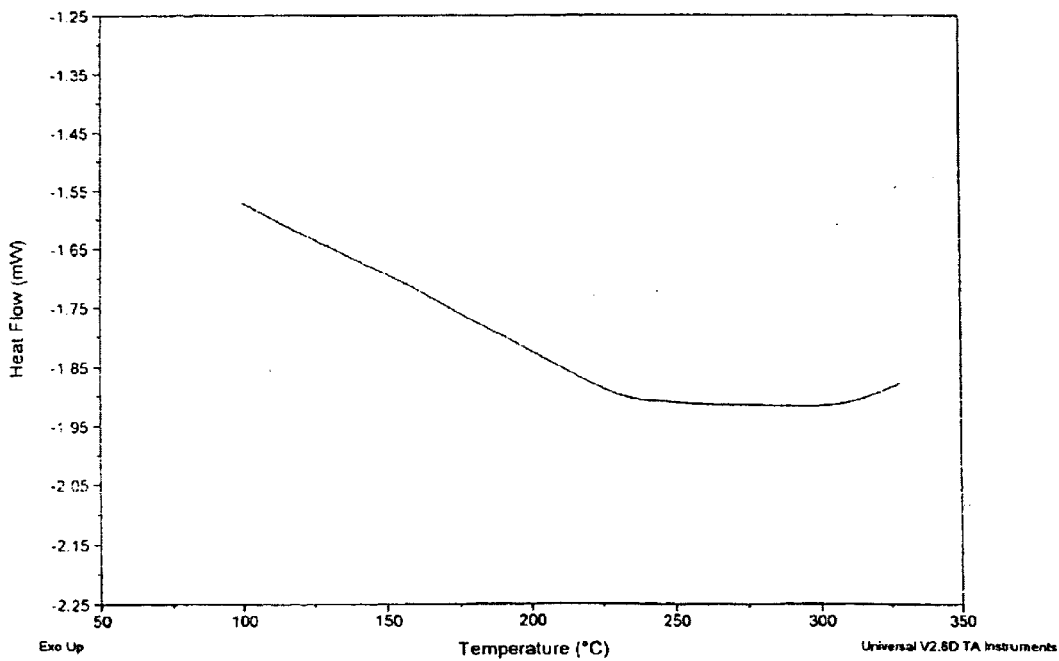

Fig. 7  Sample 104  (DSC, Cooling)
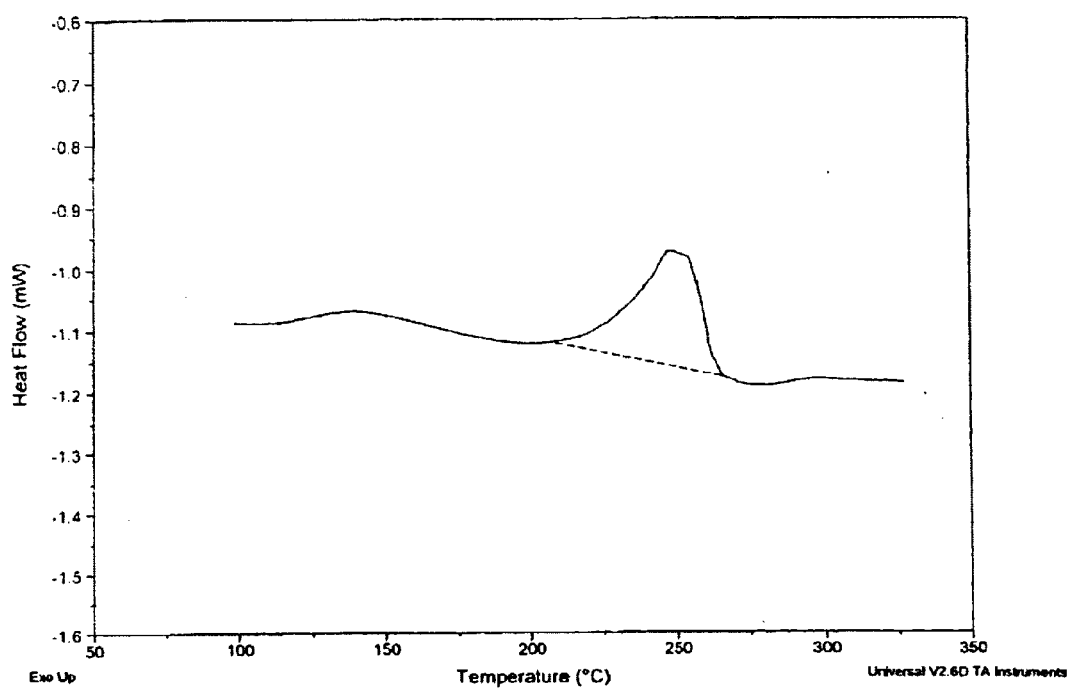
Fig. 8  Sample 104 D (DSC, 2nd heating)
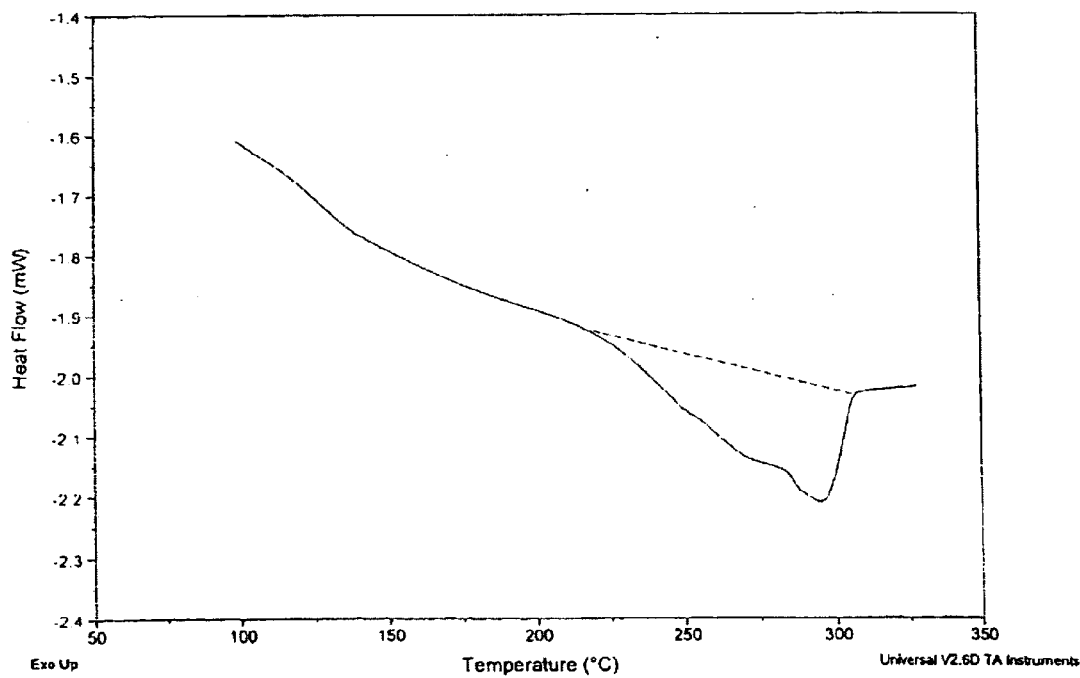

Fig. 9 Comparative sample 101 (IR)
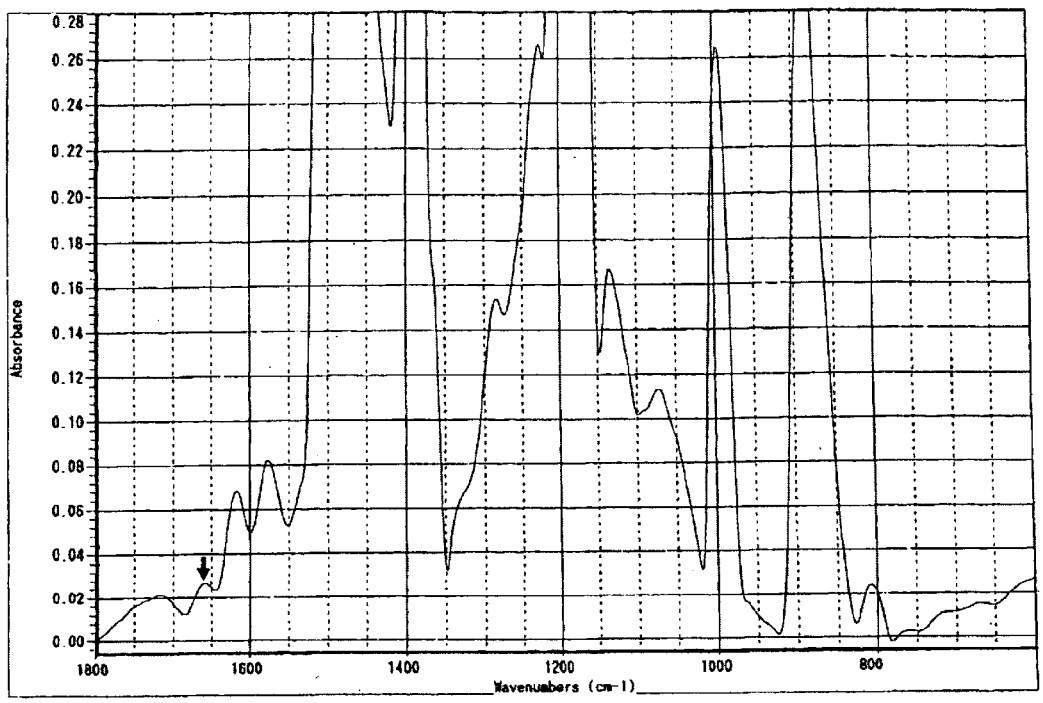
Fig. 10 Comparative sample 102 (IR)
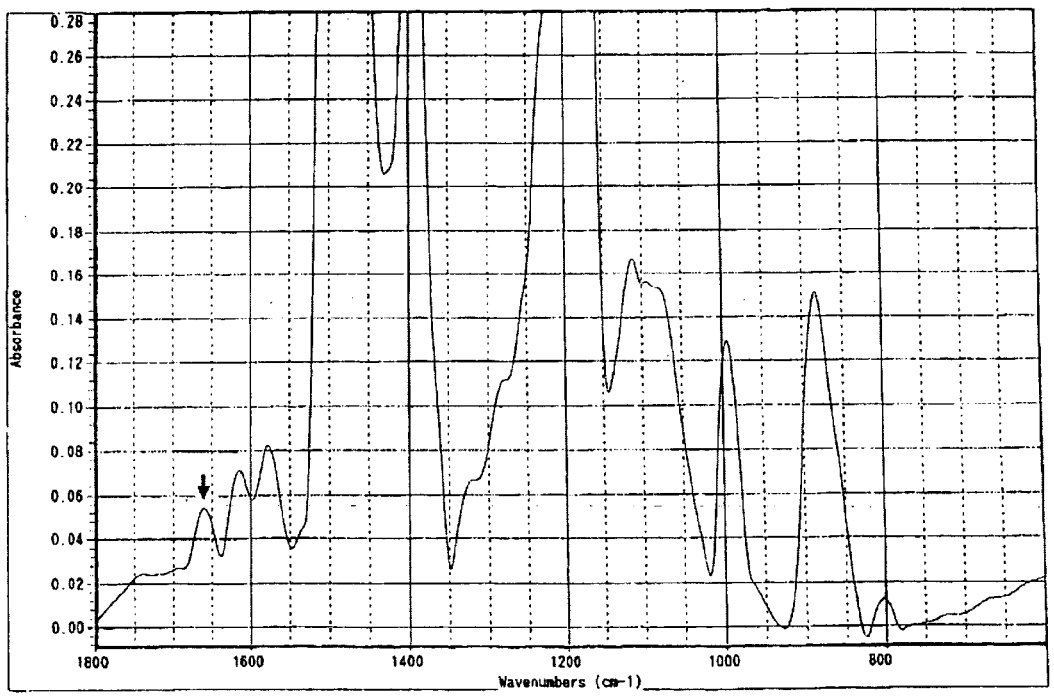

Fig. 11 Comparative sample 103 (IR)
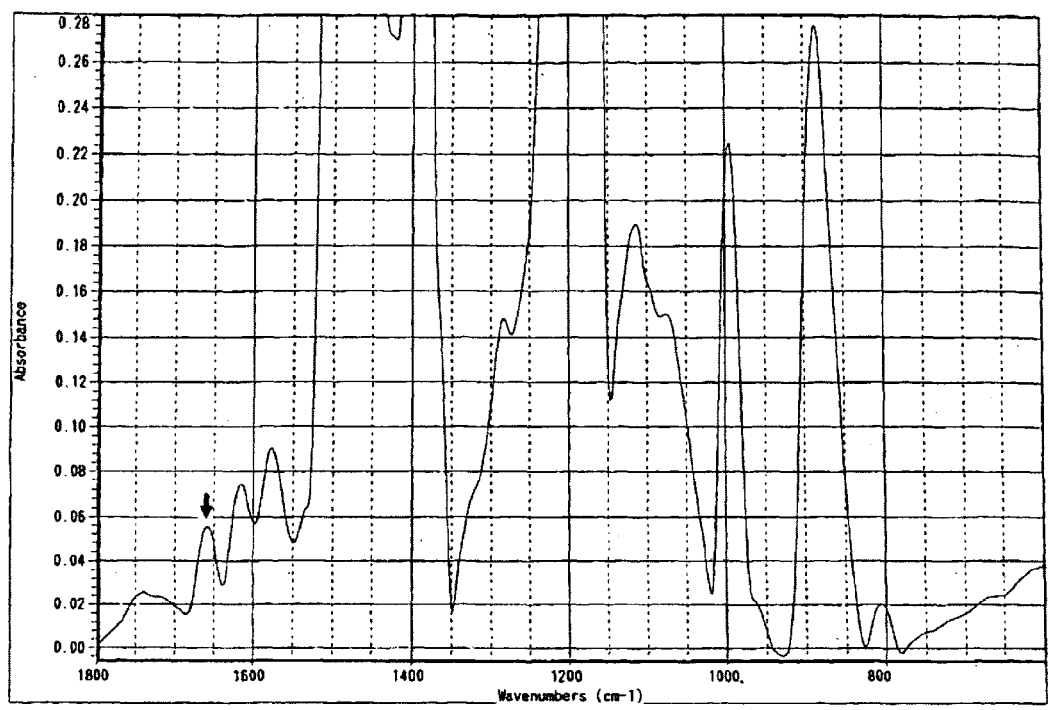
Fig. 12 Sample 104 (IR)
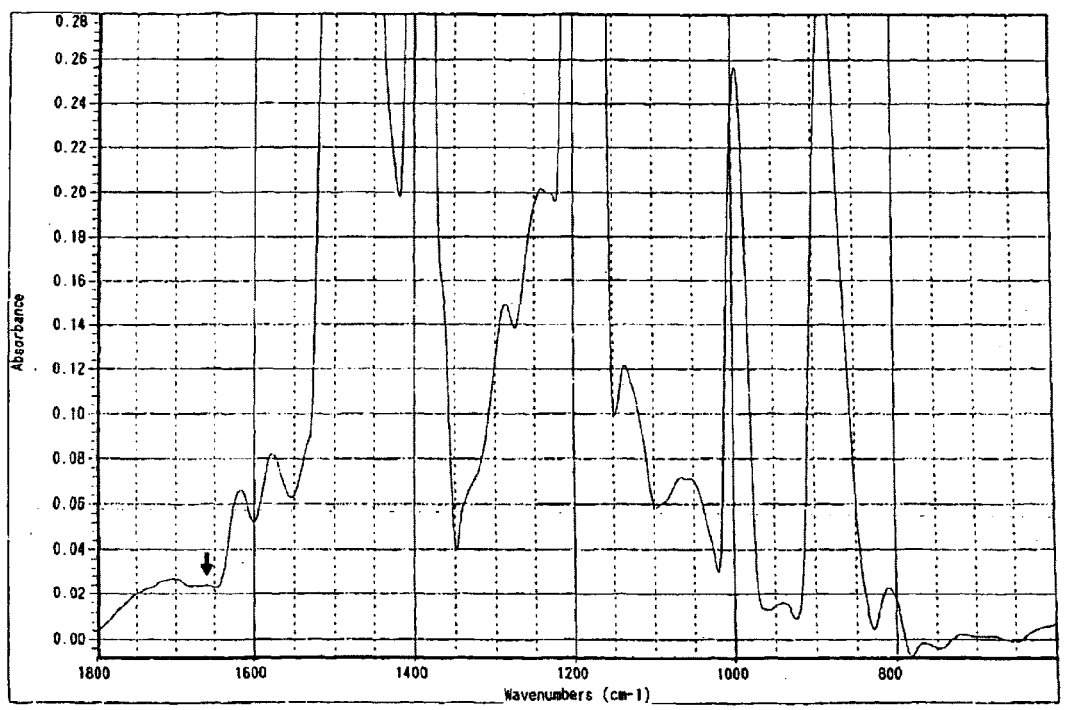

CRYSTALLIZABLE POLY (2,5-DI-SUBSTITUTED-1,4-PHENYLENE OXIDE) AND A METHOD OF PREPARING THE SAME

This application is a CON of 09/496,268 filed Feb. 1, 2000 now U.S. Pat. No. 6,541,596 and for which priority is claimed under 35 U.S.C. § 120; and this application claims priority of application Ser. No. 11-029306 and 11-076886 filed in Japan on Feb. 5, 1999 and Mar. 19, 1999, respectively under 35 U.S.C. § 119.

TECHNICAL FIELD

This invention relates to a novel crystallizable poly(2,5-di-substituted-1,4-phenylene oxide), and also to a method of preparing the same.

BACKGROUND OF THE INVENTION

As is well known in the art, poly(2,6-di-substituted-1,4-phenylene oxide)s are prepared by oxidative polymerization of 2,6-di-substituted phenols, and they exhibit high heat resistance. For instance, there are reported poly(2,6-dimethyl-1,4-phenylene oxide), in J. Am. Chem. Soc. 81, 6335–6336 (1959), and poly(2,6-diphenyl-1,4-phenylene oxide), in Macromolecules, 2, 107–108 (1969). The reason to use phenols having substituents at the 2 and 6 positions is that coupling at the two ortho positions is blocked, as is set out in J. Polym. Sci.: Part A: Polymer Chemistry, 36, 505–517 (1998).

On the other hand, with respect to the oxidative polymerization of 2,5-di-substituted phenols, which have no substituent at one of the ortho positions, there are reported a method using a copper/tetramethylethylenediamine catalyst, in Ecletica Quim., 18, 93–100 (1993); a method using a copper/dimethylpyridine catalyst, in Polymer, 20(8), 995–1002 (1979); a method using a copper/monoalkylamine catalyst, in Chem. Prum., 22(9), 451–454 (1972); a method using a copper/dialkylamine catalyst, in Polimery, 14(11), 535–538 (1969); a method using a manganese/alkoxide catalyst, in JP-B-47-619 ("JP-B" means examined Japanese Patent Publication); a method using a basic copper/pyridine catalyst, in JP-B-50-28999; and a method using a manganese/salicylaldehydeimine, in JP-B-48-20239.

However, the polymers obtained according to the methods using these catalysts are not crystallized after having once been melted. In general, it is known that, when a polymer is crystallized after melting, the heat resistance of the melt molding is kept to a level of its crystal melting point, and the solvent resistance is improved. Accordingly, since the polymers obtained by use of the known catalysts are not crystallized after melting, there arises the problem that the inherent heat resistance and solvent resistance cannot be fully developed. Presumably, this is because, with the prior art catalysts, side reactions, such as a coupling reaction at the ortho positions, an oxygenation reaction, and the like, cannot be suppressed to a satisfactory extent, so that the resultant polymer contains, in large amounts, various structures other than the 1,4-phenylene oxide structure.

SUMMARY OF THE INVENTION

Accordingly, an object of the invention is to provide a novel crystallizable poly(2,5-di-substituted-1,4-phenylene oxide).

Another object of the invention is to provide a method of preparing such a crystallizable poly(2,5-di-substituted-1,4-phenylene oxide).

Other and further objects, features, and advantages of the invention will appear more fully from the following description, taken in connection with the accompanying drawings.

BRIEF DESCRIPTION OF THE DRAWINGS

FIG. 1 is a chart showing an exothermic peak at the time of crystallization of a polymer according to the invention; and FIG. 2 is a chart showing an endothermic peak at the time of melting of crystals of a polymer according to the invention.

DETAILED DESCRIPTION OF THE INVENTION

According to the invention, there are provided:

(1) a crystallizable poly(2,5-di-substituted-1,4-phenylene oxide), which exhibits an exothermic peak for crystallization of not less than 5 J/g at 150° C. or over when cooled after melting, and/or an endothermic peak, at the time of melting of crystals thereof, of not less than 5 J/g at 150° C. or over, when re-heated after cooling, and which comprises a recurring unit represented by the following formula (I)

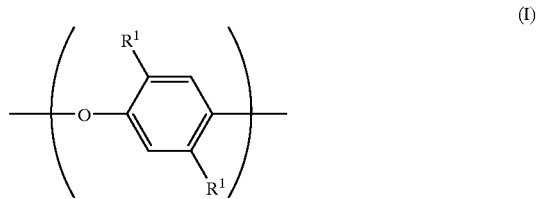

wherein $R^1$'s independently represent a hydrocarbon group or a substituted hydrocarbon group, and two $R^1$'s may be the same or different;

(2) the crystallizable poly(2,5-di-substituted-1,4-phenylene oxide) as described in (1) above, characterized in that which is substantially free of gel substance;

(3) the crystallizable poly(2,5-di-substituted-1,4-phenylene oxide) as described in (1) above, characterized in that the number average molecular weight thereof ranges from 500 to 1,000,000;

(4) the crystallizable poly(2,5-di-substituted-1,4-phenylene oxide) as described in (1) above, characterized by being obtained through oxidative polymerization of a 2,5-di-substituted phenol represented by the following formula (II)

wherein $R^1$ has the same meaning as defined in formula (I);

(5) a method of preparing the crystallizable poly(2,5-di-substituted-1,4-phenylene oxide) as described in (1) above, characterized in that a 2,5-di-substituted phenol of the above-defined formula (II) is subjected to oxidative polymerization, in the presence of oxygen and a copper complex catalyst composed of a tridentate ligand of which nitrogen atoms coordinate to a copper atom; and (6) the method of preparing the crystallizable poly(2,5-di-substituted-1,4-phenylene oxide) as described in (5) above, characterized in that the copper complex catalyst is represented by the following formula (III)

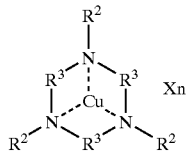

(III)

wherein R²'s independently represent a hydrocarbon group, a substituted hydrocarbon group, or a hydrogen atom, and they may be the same or different; R³'s independently represent a divalent hydrocarbon group or substituted hydrocarbon group, and they may be the same or different; X represents a counter anion, and n is the number of X that is appropriately determined depending on the valences of copper and X.

The term "poly(2,5-di-substituted-1,4-phenylene oxide)" used herein means a poly(2,5-di-substituted-1,4-phenylene oxide) comprising a recurring unit represented by the above-indicated formula (I). In the practice of the invention, the crystallizable poly(2,5-di-substituted-1,4-phenylene oxide) means a polymer that has a capability of being crystallized at the time of cooling after melting thereof.

In formula (I), $R^1$ represents a hydrocarbon group, such as an alkyl group having preferably from 1 to 30 carbon atoms (more preferably from 1 to 20 carbon atoms), an aralkyl group having preferably from 7 to 30 carbon atoms (more preferably from 7 to 20 carbon atoms), and an aryl group having from 6 to 30 carbon atoms (more preferably from 6 to 20 carbon atoms). More particularly, examples of the hydrocarbon group represented by $R^1$ include methyl group, ethyl group, n-propyl group, isopropyl group, n-butyl group, isobutyl group, t-butyl group, pentyl group, cyclopentyl group, hexyl group, cyclohexyl group, octyl group, decyl group, dodecyl group, pentadecyl group, octadecyl group, benzyl group, 2-phenylethyl group, 1-phenylethyl group, phenyl group, 4-methylphenyl group, 1-naphthyl group, 2-naphthyl group, and the like.

The substituted hydrocarbon group represented by R' of formula (I) preferably may be an alkyl group having from 1 to 30 carbon atoms (more preferably from 1 to 20 carbon atoms), an aralkyl group having from 7 to 30 carbon atoms (more preferably from 7 to 20 carbon atoms), and an aryl group having from 6 to 30 carbon atoms (more preferably from 6 to 20 carbon atoms), each substituted with a halogen atom, an alkoxy group, a di-substituted amino group, or the like. Specific examples include trifluoromethyl group, 2-t-butyloxyethyl group, 3-diphenylaminopropyl group, and the like.

The two $R^1$'s in formula (I) each preferably represent a hydrocarbon group having from 1 to 30 carbon atoms, more preferably a hydrocarbon group having from 1 to 20 carbon atoms. The preferable hydrocarbon group is an alkyl group having from 1 to 10 carbon atoms, more preferably an alkyl group having from 1 to 6 carbon atoms.

The polymer of the invention is not limited with respect to structures other than the recurring units represented by formula (I), and thus it may be a random or block copolymer. The content of the recurring units represented by formula (I) may be appropriately determined within a range not impeding the physical properties of the intended polymer, and the content is preferably not less than 80 unit %, more preferably not less than 90 unit %, and most preferably not less than 95 unit %, based on the total number of recurring units.

In the polymer of the invention, copolymer structures other than the recurring units of the formula (I) may include units represented by the following formulas (IV) to (VII), recurring units represented by the following formula (VIII), and formula (IX)

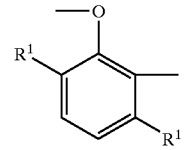

(IV)

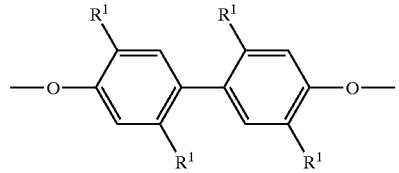

(V)

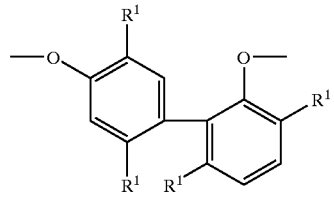

(VI)

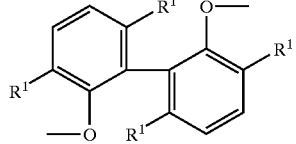

(VII)

wherein each $R^1$ has the same meaning as defined in formula (I), and all $R^1$'s may be the same or different, and

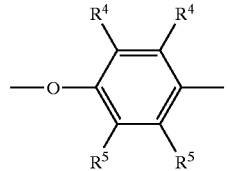

(VIII)

wherein $R^4$'s and $R^5$'s independently represent a hydrogen atom, a hydrocarbon group, or a substituted hydrocarbon group, and two $R^4$'s and two $R^5$'s may be the same or different, respectively, and two $R^4$'s and/or two $R^5$'s may form a ring,

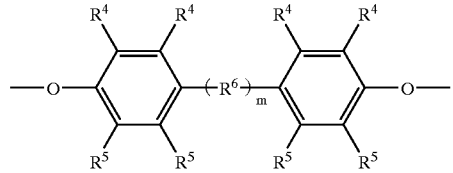

(IX)

wherein $R^4$ and $R^5$, respectively, have the same meanings as defined in formula (VIII), and all $R^4$'s and $R^5$'s may be the same or different, and the two $R^4$'s and/or the two $R^5$'s substituted on the same benzene ring, respectively, may form a ring; $R^6$ represents an oxygen atom, a sulfur atom, a divalent hydrocarbon group, or a divalent substituted hydrocarbon group, and m is 1 or 0.

Specific examples, preferred groups and the like of $R^1$ in the formulas (IV) to (VII) are, respectively, the same to those in formula (I).

"Examples of the hydrocarbon group represented $R^4$ and $R^5$ in the formula (VIII) include, if two $R^4$'s and two $R^5$'s do not form any ring, an alkyl group having from 1 to 30 carbon atoms, preferably from 1 to 20 carbon atoms; an aralkyl group having from 7 to 30 carbon atoms, preferably from 7 to 20 carbon atoms, or an aryl group having from 6 to 30 carbon atoms, preferably from 6 to 20 carbon atoms. Specific examples of those include methyl group, ethyl group, n-propyl group, isopropyl group, n-butyl group, isobutyl group, t-butyl group, pentyl group, cyclopentyl group, hexyl group, cyclohexyl group, octyl group, decyl group, dodecyl group, pentadecyl group, octadecyl group, benzyl group, 2-phenylethyl group, 1-phenylethyl group, phenyl group, 4-methylphenyl group, 1-naphthyl group, 2-naphthyl group, and the like. When two $R^4$'s and/or two $R^5$'s form a ring, a five to seven-membered ring is preferred, for which two $R^4$'s and/or two $R^5$'s more preferably may bond to form —(CH$_2$)$_3$— group, —(CH$_2$)$_4$— group or —CH=CH—CH=CH— group, and form a ring."

Examples of the substituted hydrocarbon group represented by $R^4$ and $R^5$ of the formula (VIII), respectively, include, if the two $R^4$'s and two $R^5$'s do not form any ring, an alkyl group having from 1 to 30 carbon atoms, preferably from 1 to 20 carbon atoms; an aralkyl group having from 7 to 30 carbon atoms, preferably from 7 to 20 carbon atoms, or an aryl group having from 6 to 30 carbon atoms, preferably from 6 to 20 carbon atoms, each substituted with a halogen atom, an alkoxy group, a di-substituted amino group, and the like. Specific examples include a trifluoromethyl group, a 2-t-butyloxyethyl group, a 3-diphenylaminopropyl group, and the like. When the two $R^4$'s and/or two $R^5$'s join together to form a ring, the above-indicated substituted five to seven-membered rings are preferred, and preferably the two $R^4$'s and/or two $R^5$'s may bond to form —CH$_2$—O—CH$_2$— group, —(CH$_2$)$_3$— group, —(CH$_2$)$_4$— group, or —CH=CH—CH=CH= group, having such a substituent as mentioned above, and form a ring.

$R^4$ and $R^5$ of formula (VIII) preferably represent a hydrogen atom or a hydrocarbon group having from 1 to 30 carbon atoms, more preferably a hydrogen atom or an alkyl group having from 1 to 20 carbon atoms. Most preferably, $R^4$ represents a hydrogen atom or an alkyl group having from 1 to 20 carbon atoms, and $R^5$ represents a hydrogen atom or methyl group.

Specific examples, preferred groups, and the like of $R^4$ and $R^5$ in the above formula (IX) are the same as those defined with respect to the aforementioned formula (VIII).

The divalent hydrocarbon group represented by $R^6$ in formula (IX) may preferably be an alkylene group having from 1 to 30 carbon atoms, more preferably from 1 to 20 carbon atoms; an aralkylene group having from 7 to 30 carbon atoms, more preferably from 7 to 20 carbon atoms; or an arylene group having from 6 to 30 carbon atoms, more preferably from 6 to 20 carbon atoms. Specific examples include methylene group, 1,1-ethylene group, 1,2-ethylene group, 1,1-propylene group, 1,3-propylene group, 2,2-propylene group, 1,1-butylene group, 2,2-butylene group, 3-methyl-2,2-butylene group, 3,3-dimethyl-2,2-butylene group, 1,1-pentylene group, 3,3-pentylene group, 1,1-hexylene group, 1,1-heptylene group, 1,1-octylene group, 1,1-nonylene group, 1,1-dodecylene group, 1,1-pentadecylene group, 1,1-octadecylene group, 1,1-cyclopentylene group, 1,1-cyclohexylene group, phenylmethylene group, diphenylmethylene group, 1-phenyl-1,1-ethylene group, 9,9-fluorene group, α,α'-1,4-diisopropylphenylene group, 1,2-phenylene group, 1,3-phenylene group, 1,4-phenylene group, and the like.

The divalent substituted hydrocarbon group represented by $R^6$ in formula (IX) preferably may be an alkylene group having from 1 to 30 carbon atoms, more preferably from 1 to 20 carbon atoms; an aralkylene group having from 7 to 30 carbon atoms, more preferably from 7 to 20 carbon atoms; or an arylene group having from 6 to 30 carbon atoms, more preferably from 6 to 20 carbon atoms, each substituted with a halogen atom, an alkoxy group, a di-substituted amino group, and the like. Specific examples include a hexafluoro-2,2-propylene group, a pentafluoro-phenylmethylene group, a 4-methoxyphenylmethylene group, a 4-dimethylaminophenylmethylene group, and the like.

$R^6$ in formula (IX) is preferably an oxygen atom or a divalent hydrocarbon group, more preferably, is an alkylene group having from 1 to 20 carbon atoms or an aralkylene group having from 7 to 20 carbon atoms, and most preferably, is an alkylene group having from 1 to 6 carbon atoms.

The polymer of the invention is a poly(2,5-di-substituted-1,4-phenylene oxide) that exhibits an exothermic peak of crystallization of not less than 5 J/g at 150° C. or over at the time of cooling after melting, and/or it exhibits an endothermic peak of not less than 5 J/g at 150° C. or over upon melting of the polymer crystals at the time of re-heating after cooling. More preferably, the polymer consists of a poly(2,5-di-substituted-1,4-phenylene oxide) that exhibits both an exothermic peak of crystallization of not less than 5 J/g at 150° C. or over at the time of cooling after melting, and an endothermic peak of not less than 5 J/g at 150° C. or over upon melting of the polymer crystals at the time of re-heating after cooling.

The temperature to melt the polymer is one at which the polymer can melt. However, it is generally 150° C. or over, preferably 200 to 500° C., more preferably 300 to 400° C., and much more preferably 325 to 375° C.

When the exothermic peak temperature at which the polymer is crystallized when cooled after melting (crystallization temperature) is lower than 150° C., the resulting polymer is not imparted with a satisfactory heat resistance, thus being unfavorable. Moreover, when the quantity of heat at the exothermic peak for crystallization (heat of crystallization) is less than 5 J/g, a satisfactory degree of crystallization is not obtained, thus being unfavorable.

The exothermic peak temperature at which crystallization takes place at the time of cooling after melting of the polymer is preferably 180° C. or over, more preferably 210° C. or over, and most preferably 240° C. or over. The quantity of heat at the exothermic peak for the crystallization should preferably be not less than 7.5 J/g, more preferably not less than 10 J/g, and most preferably not less than 12.5 J/g. The upper limit of the quantity of heat at the exothermic peak for the crystallization is usually at 200 J/g.

When the endothermic peak temperature (melting temperature), at which the crystals are melted at the time of re-heating after melting and cooling of the polymer, is lower than 150° C., a satisfactory heat resistance cannot be expected, thus being unfavorable. In addition, when the quantity of heat at the endothermic peak for melting of crystals (heat of melting) is less than 5 J/g, a satisfactory degree of crystallization is not obtained, thus being unfavorable.

The endothermic peak temperature for the melting of the crystals at the time of re-heating after melting and cooling of the polymer is preferably 200° C. or over, more preferably 250° C. or over, and most preferably 280° C. or over. The quantity of heat at the endothermic peak for the melting of the crystals is preferably 10 J/g or over, more preferably 15 J/g or over, and most preferably 20 J/g or over. The upper limit of the quantity of heat is usually 200 J/g.

Preferably, the polymer of the invention is substantially free of gel substance. This is confirmed by dissolving 1 mg of the polymer in, at least, 1 ml of 1,2-dichlorobenzene at 150° C. The term "substantially free of" means that gel substance is preferably 5 wt % or less, more preferably 2 wt % or less, in the polymer, and most preferably no gel substance is included in the polymer.

The poly(2,5-di-substituted-1,4-phenylene oxide) of the invention is not especially limited with respect to the molecular weight thereof. Preferably, the number average molecular weight is in the range of 500 to 1,000,000, more preferably from 1,000 to 100,000, and most preferably from 2,000 to 50,000.

The polymer comprising the recurring unit of the afore-indicated formula (I) according to the invention can be prepared by oxidative polymerization of a 2,5-di-subsituted phenol of the following formula (II)

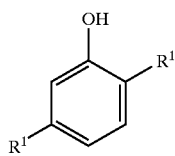

(II)

wherein $R^1$ has the same meaning as defined in formula (I).

Specific examples, preferred groups, and the like represented by $R^1$ in the above formula (II) are those as defined in formula (I).

In the practice of the invention, 2,5-di-substituted phenols of the above formula (II) may be used singly or in combination, when subjected to oxidative polymerization, or they may be subjected to oxidative polymerization after mixing with a phenol represented by the following formula (X), and/or a bisphenol represented by the following formula (XI)

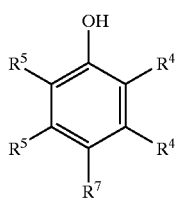

(X)

wherein $R^4$ and $R^5$, respectively, have the same meanings as defined for the aforementioned formula (VIII), and $R^7$ represents a hydrogen atom, phenoxy group, a hydrocarbon group, or a substituted hydrocarbon group

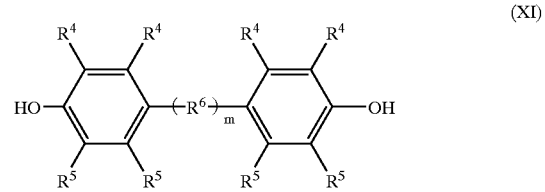

(XI)

wherein $R^4$, $R^5$, $R^6$, and m, respectively, have the same meanings as defined for the aforementioned formula (IX).

Specific examples and preferred groups represented by $R^4$ and $R^5$ in the above formula (X) are the same to those defined in the above-indicated formula (VIII).

Specific examples and preferred examples of the hydrocarbon group or substituted hydrocarbon group represented by $R^7$ in the above formula (X) are those defined with respect to $R^1$ of the aforementioned formula (I).

More particularly, $R^7$ of the formula (X) preferably represents a hydrogen atom, a phenoxy group, or a hydrocarbon group having from 1 to 30 carbon atoms, more preferably from 1 to 20 carbon atoms. More preferably, $R^7$ represents a hydrogen atom, a phenoxy group, or a hydrocarbon group having from 1 to 6 carbon atoms, and specific examples include a hydrogen atom or a phenoxy group.

Specific examples and preferred groups represented by $R^4$, $R^5$, and $R^6$ in the above formula (XI) are the same to those defined in the above-indicated formula (IX).

When using the mixture of a 2,5-di-substituted phenol represented by the aforementioned formula (II), and a phenol represented by the above-indicated formula (X) and/or a bisphenol represented by the above-indicated formula (XI), the mixing ratio may be appropriately determined within a range not impeding the physical properties of the intended polymer, and the 2,5-di-substituted phenol is in the range of preferably not less than 80 mol %, more preferably not less than 90 mol %, and most preferably not less than 95 mol %, based on the total phenol monomers (and these phenol monomers may sometimes be called a phenolic starting material hereinafter).

The method of preparing the polymer of the invention is now described in more detail.

The catalyst used for the oxidative polymerization should preferably be made of a copper complex catalyst that is composed of a tridentate ligand in which nitrogen atoms coordinate to a copper atom.

The tridentate ligand in the copper complex catalyst is one in which nitrogen atoms are coordinating atoms. The term "ligand" means, as set out in "ENCYCLOPEDIA CHIMICA" (first edition, published by Tokyo Kagaku Dojin, 1989), a molecule or ion bonded to a certain atom via a coordination bond. The atom, which takes direct part in the bond, is called a coordinating atom. The tridentate ligand means a ligand having three coordinating atoms.

It will be noted that, when using a catalyst that is composed of a bidentate ligand and a monodentate ligand in which coordinating atoms are nitrogen atoms, and a copper atom, the resultant polymer does not exhibit any crystallinity after melting and cooling, thus being unfavorable.

With respect to the tridentate ligand used in the copper complex catalyst there is no limitation provided that it coordinates to the copper atom with nitrogen atoms. Specific examples of such tridentate ligand include diethylenetriamine, bis(2-pyridylmethyl)amine, bis(2-pyridylethyl)amine, bis(2-imidazolylmethyl)amine, bis(2-oxazolylmethyl)amine, bis(2-thiazolylmethyl)amine, N-(2-pyridylmethylidene)-N-(2-pyridylmethyl)amine, 2,2':6',2''- terpyridine, 3-(2-pyridylmethylimino)-2-butanonoxime, tris(2-pyridyl)methane, tris(2-imidazoyl)methane, tris(1-pyrazolyl)methane, tris(1-pyrazolyl) phosphate, tris(1-pyrazolyl) borate, 1,4,7-triazacyclononane, derivatives thereof, and the like.

The valence of the copper atom in the copper complex catalyst ranges from 0 to 3, preferably 1 or 2.

In the copper complex catalyst, the ratio between the tridentate ligand and the copper atom is not limited, and preferably, one or more copper atoms are present per unit tridentate ligand. More preferably, from 1 to 3 copper atoms are present, and most preferably one copper atom is present, per unit of the tridentate ligand.

In the copper complex catalyst, the structure other than the ligand and the copper atom is not limited, provided that the catalytic ability is not lost. Moreover, the copper complex catalyst may have a solvent or the like coordinated in starting materials for the complex, and during the course of its preparation and/or during the course of the oxidative polymerization.

The copper complex catalyst may require a counter ion, to keep electric neutrality. The counter anion ordinarily used for this includes a conjugated base of Brønsted acid. Specific examples include fluoride ion, chloride ion, bromide ion, iodide ion, sulfate ion, nitrate ion, carbonate ion, perchlorate ion, tetrafluoroborate ion, hexafluorophosphate ion, methanesulfonate ion, trifluoromethanesulfonate ion, toluenesulfonate ion, acetate ion, trifluoroacetate ion, propionate ion, benzoate ion, hydroxide ion, oxide ion, methoxide ion, ethoxide ion, and the like. Preferred counter anions include chloride ion, bromide ion, iodide ion, sulfate ion, nitrate ion, acetate ion, hydroxide ion or methoxide ion. More preferred examples of counter anion include chloride ion, bromide ion, sulfate ion, or nitrate ion. Cations, such as of alkali metals, alkaline earth metals, and the like, may be appropriately used as a counter cation.

A preferred copper complex catalyst is one represented by the following formula (III)

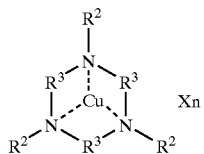

(III)

wherein $R^2$'s independently represent a hydrocarbon group, a substituted hydrocarbon group, or a hydrogen atom, and all $R^2$'s may be the same or different; $R^3$'s independently represent a divalent hydrocarbon group or substituted hydrocarbon group, and all $R^3$'s may be the same or different; X represents a counter anion, and n is the number of X that is appropriately determined depending on the valences of copper and X.

Preferable hydrocarbon group represented by $R^2$ of formula (III) is an alkyl group having from 1 to 20 carbon atoms, an aralkyl group having from 7 to 20 carbon atoms, or an aryl group having from 6 to 20 carbon atoms. Specific examples include methyl group, ethyl group, n-propyl group, isopropyl group, n-butyl group, isobutyl group, t-butyl group, 1-pentyl group, 3-pentyl group, cyclopentyl group, hexyl group, cyclohexyl group, octyl group, decyl group, 4-methylcyclohexyl group, 4-t-butylcyclohexyl group, 3,5-dimethylcyclohexyl group, benzyl group, 2-phenylethyl group, 1-phenylethyl group, phenyl group, 1-naphthyl group, 2-naphthyl group, and the like.

The substituted hydrocarbon group represented by $R^2$ in formula (III) is the hydrocarbon group defined as the preferable hydrocarbon group above, which is substituted with a halogen atom, an alkoxy group, a di-substituted amino group, or the like. Specific examples include pentafluorophenylmethyl group, methoxyethyl group, diphenylaminopropyl group, and the like.

$R^2$ in formula (III) preferably represents a hydrocarbon group, more preferably an alkyl group having from 1 to 20 carbon atoms or an aralkyl group having from 7 to 20 carbon atoms, and most preferably an alkyl group having from 2 to 12 carbon atoms.

Preferable divalent hydrocarbon group represented by $R^3$ in the formula (III) is an alkylene group having 1 to 20 carbon atoms or an arylene group having from 6 to 20 carbon atoms. Specific examples include methylene group, 1,2-ethylene group, 1,2-propylene group, 1,3-propylene group, 2,4-butylene group, 2,4-dimethyl-2,4-butylene group, 1,2-diphenyl-1,2-ethylene group, 1,2-cyclopentylene group, 1,2-cyclohexylene group, 1,2-phenylene group, and the like.

The divalent substituted hydrocarbon group represented by $R^3$ in formula (III) is the divalent hydrocarbon group mentioned above as preferred, which is substituted with a halogen atom, an alkoxy group, or a di-substituted amino group. Specific examples include tetrafluoro-1,2-ethylene group, 4,5-dimethoxy-1,2-phenylene group, 4-dimethylamino-1,2-phenylene group, and the like.

In formula (III), $R^3$ is preferably a divalent hydrocarbon group. More preferably, $R^3$ is an alkylene group having from 1 to 20 carbon atoms, much more preferably an alkylene group having from 2 to 6 carbon atoms, and most preferably 1,2-ethylene group.

In formula (III), the valence of copper is usually 1 or 2, X is a counter anion, and n is the number of X that is determined depending on the valence of copper.

The structure other than mentioned above in formula (III) is not limited, provided that the catalytic activity is not lost. In addition, a solvent or the like may be coordinated in the starting materials of the complex, or during the course of preparation and/or the oxidation coupling reaction.

The copper complex can be synthesized, for example, by a method in which a tridentate ligand compound and a copper compound are mixed in an appropriate solvent. As the copper compound, appropriate use may be made of Brønsted acid salts of copper, or the like. For the tridentate ligand compound, commercially available products may be conveniently used, and such a compound may be synthesized with reference to J. Chem. Soc. Dalton Trans., 83–90 (1993); J. Am. Chem. Soc., 8865–8866, 117 (1995), and the like.

The copper complex used may be one that has been synthesized beforehand or one formed in a reaction system.

The catalyst may be used in arbitrary amounts and is generally preferably within a range of 0.001 to 50 mol %, more preferably 0.01 to 10 mol %, calculated as copper, relative to the phenolic starting material.

When the copper in the copper complex is divalent and the complex has a conjugated base of an acid stronger than phenol as the counter ion, preferably a base incapable of deactivating the copper complex catalyst coexists at the time of polymerization, in an amount of not less than 1/4 equivalents of the counter ion. Examples of such a base include hydroxides, oxides and alkoxides, of alkali metal or alkaline earth metal, respectively, such as sodium hydroxide, potassium hydroxide, calcium oxide, sodium methoxide, sodium ethoxide, and the like; amines, such as methylamine, ethylamine, propylamine, butylamine, dibutylamine, triethylamine, and the like; and pyridines, such as pyridine, 2-methylpyridine, 2,6-dimethylpyridine, 2,6-diphenylpyridine, and the like. More preferably an alkoxide, an amine, or a pyridine is caused to coexist in an amount of not less than 1/4 equivalents of a counter ion. The coexistence of a pyridine, in an amount of not less than 1/2 equivalents of a counter ion, is most preferred.

The oxidizing agent used for the oxidative polymerization to prepare the polymer of the invention includes oxygen, which may be in admixture with an inert gas, and air. The amount of oxygen is generally not less than an equivalent of, or in large excess relative to, a phenolic starting material.

The oxidative polymerization is feasible in the absence of a reaction solvent, but a solvent is generally favorably used. The solvent is not limited in type, as long as it is inert to the phenolic starting material and is liquid at a reaction temperature. Preferred examples of the solvent include aromatic hydrocarbons, such as benzene, toluene, xylene, and the like; acyclic or cyclic aliphatic hydrocarbons, such as heptane, cyclohexane, and the like; halogenated hydrocarbons, such as chlorobenzene, dichlorobenzene, dichloromethane, and the like; nitriles, such as acetonitrile and benzonitrile; alcohols, such as methanol, ethanol, n-propyl alcohol, isopropyl alcohol, and the like; ethers, such as dioxane, tetrahydrofuran, ethylene glycol dimethyl ether, and the like; amides, such as N,N-dimethylformamide, N-methylpyrrolidone, and the like; nitro compounds, such as nitromethane, nitrobenzene, and the like; and water. Aromatic hydrocarbons, acyclic or cyclic aliphatic hydrocarbons, halogenated hydrocarbons, nitriles, ethers, and nitro compounds are more preferably, and aromatic hydrocarbons and hydrogenated hydrocarbons are most preferably. These may be used singly or in admixture.

When using the solvent, the concentration of a phenolic starting material is preferably in the range of 0.5 to 50 wt %, more preferably from 1 to 30 wt %.

The reaction temperature for the oxidative polymerization is not limited, provided that the reaction medium used is kept liquid. In the absence of any solvent, a temperature not lower than the melting point of the phenolic starting material is necessary. A preferred temperature ranges from 0° C. to 200° C., more preferably from 0° C. to 150° C., and most preferably from 0° C. to 100° C. Where the reaction is performed from the standpoint of energy-saving, a preferred reaction temperature ranges from 10° C. to 60° C. The reaction time may change depending on the conditions, such as the amount of a catalyst and the reaction temperature, and it is generally in the range of 1 hour or over, preferably from 3 to 300 hours.

The poly(2,5-di-substituted-1,4-phenylene oxide) of the invention may be used singly or as a composition in combination with other polymers and/or improvers. Specific examples of the polymer components of such a composition include polyolefins, such as polyethylene, polypropylene, polystyrene, poly(vinyl chloride), poly(methyl methacrylate), poly(vinyl acetate), polyacrylonitrile, copolymers thereof, and the like; polyethers, such as polyoxymethylene, poly(phenylene oxide), poly(2,6-dimethyl-1,4-phenylene oxide), copolymers thereof, and the like; polyesters, such as poly(ethylene terephthalate), poly(butylene terephthalate), poly(ethylene-2,6-dinaphthalate), poly(4-oxybenzoate), poly(2-oxy-6-naphthalate), copolymers thereof, and the like; polyamides, such as nylon 6, nylon 66, and the like; polycarbonates; poly(phenylene sulfide)s; polysulfones; poly(ether sulfone)s; poly(ether ether ketone)s; polyimides; poly(ether imide)s; and thermoset polymers, such as phenolic resins, urea resins, melamine resins, epoxy resins, and the like. Specific examples of component to improve the composition include stabilizers, such as 2,6-di-t-butylphenol derivatives, 2,2,6,6-tetramethylpiperidines, and the like; flame retardants, such as polyhalides, phosphoric esters, and the like; surfactants and fluid improvers.

The crystallizable poly(2,5-di-substituted-1,4-phenylene oxide) of the invention is one that is crystallized after melting-cooling and that assumes a reduced degree of coloration. The crystallizable poly(2,5-di-substituted-1,4-phenylene oxide) of the invention has excellent solvent resistance to usual organic solvents; it is high in heat resistance, and is useful as a melt molding material or a film material. Moreover, according to the method of the invention, the crystallizable poly(2,5-di-substituted-1,4-phenylene oxide) having such excellent physical properties as mentioned above can be efficiently prepared. Additionally, according to the method of the invention, the polymer can be prepared at a reaction temperature close to normal temperatures, and it is advantageous in that water alone is formed as a main side product, and the method is performed in an energy-saving and clean manner.

The present invention is further explained in detail with reference to the following examples, but they are not meant to limit the present invention.

EXAMPLES (i) Analysis

Conversion of monomer: 15 mg of a reaction mixture, containing diphenyl ether as an internal standard substance, was sampled, to which a slight amount of concentrated hydrochloric acid was added, to render the mixture acidic, followed by further addition of 2 g of methanol, to provide a sample for measurement. This sample was subjected to quantitative analysis by high-perfomance liquid chromatography (pump: SC8020 system, made by Tosoh Corporation; detector: PD-8020, made by Tosoh Corporation; detecting wavelength: 278 nm; column: ODS-AM, made by YMC Co., Ltd.; developing solvent: starting with a mixture of methanol/water at 68:32, which was changed to 100/0 after 38 minutes, followed by keeping this till 50 minutes), using the diphenyl ether as the internal standard substance.

Solubility of polymer: 1 mg of a polymer was added to 1 ml of 1,2-dichlorobenzene (hereinafter abbreviated as oDCB) and heated to 150° C., after which the presence or absence of an insoluble matter (defined as a gel component) was observed.

Number average molecular weight (Mn) and weight average molecular weight (Mw) of polymer: The weight average molecular weight (Mw) and the number average molecular weight (Mn) were, respectively, measured, calculated as a standard polystyrene value, through analysis by gel permeation chromatography. The chromatography was conducted at 140° C. using the PL-GPC210 system, made by Polymer Laboratories Inc., and using three columns of Plgel 10 um MIXED-B of Polymer Laboratories, Inc., and oDCB (containing 0.1% w/v of 2,6-di-t-butyl-4-methylphenol) as a developing solvent.

Crystallization temperature (Tc) and quantity of heat for crystallization (Hc), after melting of polymer, and melting temperature (Tm) and quantity of heat for melting (Hm), after crystallization of polymer: Differential scanning calorimetric analysis (DSC3200S of MAC SCIENCE Co., Ltd.) was carried out in an atmosphere of argon. Initially, the sample was heated from room temperature to 350° C. at a rate of 10° C./minute, kept at the temperature for 5 minutes. Next, when an exothermic peak of not less than 5 J/g at 150°

C. or over was attained under conditions in which the melting sample was cooled from 350° C. to room temperature at a rate of 10° C./minute, the resultant peak top temperature was determined as the crystallization temperature (Tc), with the peak area being determined as the quantity of heat for the crystallization (Hc). Next, when an endothermic peak of not less than 5 J/g at 150° C. or over was shown under conditions in which the sample was re-heated from room temperature to not less than 350° C. at a rate of 10° C./minute, the resultant peak top temperature was determined as the melting temperature (Tm), with the peak area being determined as the quantity of heat for the melting (Hm). The case when no peak for the crystallization or melting was observed, was determined to be N. D.

(ii) Oxidative Polymerization

Example 1

A 2 L rubber balloon filled with oxygen was attached to a 25-ml, two-necked, round flask equipped with an electromagnetic stirrer, to purge the flask with oxygen. 0.006 mmol of $Cu(Cl_2)(1,4,7$-triisopropyl-1,4,7-triazacyclononane (hereinafter abbreviated as Cu(tacn), and see J. Am. Chem. Soc., 120, 8529–8530, (1998)) was charged into the flask, followed by addition of 1.2 mmol of 2,5-dimethylphenol and 0.06 mmol of 2,6-diphenylpyridine as a base, both dissolved in 2.4 g of toluene. The mixture was kept at 40° C. and agitated vigorously. After 72 hours, several droplets of concentrated hydrochloric acid were added to the mixture, so as to render it acidic, followed by further addition of 25 ml of methanol and collection of the resultant precipitate of polymer by filtration. The precipitate was washed three times with 10 ml of methanol, and dried under reduced pressure at 60° C. for 6 hours, to obtain a white polymer. The results of analysis of the polymer are shown in Table 1. The exothermic peak for the crystallization of the polymer is shown in FIG. 1, and the endothermic peak for the melting of the crystals is shown in FIG. 2.

The thus-obtained polymer was subjected to NMR analyses (LA600 of JEOL, Ltd.) in 1,2-dichlorobenzene-d4 at 100° C. The results of 1H-NMR (600 MHz) revealed peaks observed at 2.17 ppm (6H, s) and 6.72 ppm (2H, s), and the results of 13C-NMR (150 MHz) revealed peaks found at 15.6 ppm, 120.3 ppm, and 151.1 ppm (with another peak being superposed with that of 1,2-dichlorobenzene-d4). From this, it was found that the polymer had, as recurring units, the 2,5-dimethyl-1,4-phenylene oxide structure.

Example 2

A white polymer was obtained in the same manner as in Example 1, except that Cu(tacn) was added at 0.06 mmol, 2,6-diphenylpyridine was added at 0.6 mmol, and the reaction time was 24 hours. The conversion and yield in the reaction are shown in Table 1, along with the results of analysis on the physical properties of the polymer. This polymer was confirmed as having recurring units similar to those of Example 1.

Example 3

A white polymer was obtained in the same manner as in Example 1, except that 1,2-dichlorobenzene was used as the solvent, and the reaction time was changed as shown in Table 1. The results of analysis of the polymer are shown in Table 1.

Example 4

A white polymer was obtained in the same manner as in Example 2, except that xylene was used as the solvent. The results of analysis are shown in Table 1.

Comparative Example 1

A 2 L rubber balloon filled with oxygen was attached to a 25-ml, two-necked, round flask equipped with an electromagnetic stirrer, and the flask was purged with oxygen. 0.06 mmol of cuprous chloride (hereinafter referred to as CUCl) was charged into the flask, followed by further addition of 2.52 mmol of N,N,N',N'-tetramethylethylenediamine (hereinafter abbreviated as tmed) and 1.2 mmol of 2,5-dimethylphenol dissolved in 6 ml of chlorobenzene. The resultant mixture was kept at 40° C. and agitated vigorously. After 24 hours, the mixture was after-treated in the same manner as in Example 1, to obtain a brownish polymer as a methanol-insoluble matter. The results of analysis of the polymer are shown in Table 1.

Comparative Examples 2 to 4

Polymers that were all brownish in color were obtained in the same manner as in Comparative Example 1, except that the catalyst, solvent, reaction temperature, and reaction time were, respectively, changed as shown in Table 1. The results of analysis of the polymers are shown in Table 1.

It will be noted that, with respect to the catalysts in the table, the term "CuCl/2,6-Me$_2$Py" means CuCl/2,6-dimethylpyridine (1/3 mol/mol), the term "CuCl/n-Pr$_2$NH" means CuCl/di-n-propylamine (1/1 mol/mol), and the term "CUCl$_2$/c-HexNH$_2$" means CuCl$_2$ .2H$_2$O/cyclohexylamine (1/16 mol/mol). The solvent in Comparative Example 4 was made of benzene/ethanol (7/3 vol/vol).

Comparative Example 5

A 2 L rubber balloon filled with oxygen was attached to a 25-ml, two-necked, round flask equipped with an electromagnetic stirrer, and the flask was purged with oxygen. 0.096 mmol of potassium t-butoxide (hereinafter abbreviated as t-BuOK) was charged into the flask, followed by addition of 1.2 mmol of 2,5-dimethylphenol dissolved in 2.4 g of toluene, and further addition of 0.012 mmol of MnCl$_2$ .4H$_2$O(abbreviated as MnCl$_2$) dissolved in 240 mg of methanol. The resultant mixture was kept at 40° C. and agitated vigorously. After 25 hours, the mixture was after-treated in the same manner as in Example 1, to obtain a brownish polymer as a methanol-insoluble matter. The results of analysis of the polymer are shown in Table 1.

Comparative Example 6

A 2 L rubber balloon filled with oxygen was attached to a 25-ml, two-necked, round flask equipped with an electromagnetic stirrer, and the flask was purged with oxygen. Forty mg of a basic copper salt (hereinafter abbreviated as basic CuCl), which was obtained by allowing CuCl to stand in air for 2 days, and 710 mg of pyridine (hereinafter abbreviated as py) were placed in the flask, followed by further addition of 1.2 mmol of 2,5-dimethylphenol dissolved in 2 ml of nitrobenzene. The resultant solution was kept at 30° C. and agitated vigorously. After 8 hours, the solution was after-treated in the same manner as in Example 1, to obtain a brownish polymer as a methanol-insoluble matter. The results of analysis of the polymer are shown in Table 1.

Comparative Example 7

A 2 L rubber balloon filled with oxygen was attached to a 25-ml, two-necked, round flask equipped with an electromagnetic stirrer, and the flask was purged with oxygen. A solution of 0.34 mmol of potassium hydroxide in 1.5 ml of methanol was placed in the flask, followed by further addition of 0.24 mmol of salicylaldehyde ethylimine (hereinafter abbreviated as salea) and 0.12 mmols of $MnCl_2$, followed by agitation for about 5 minutes. Moreover, a solution of 1.2 mmols of 2,5-dimethylphenol in 2.4 g of toluene was further added to the solution. This solution was kept at 30° C. and agitated vigorously. After 8 hours, the solution was after-treated in the same manner as in Example 1, to obtain a brownish polymer as a methanol-insoluble matter. The results of analysis of the polymer are shown in Table 1.

Among the results in Table 1, the crystallinity is discussed. The polymers obtained in Comparative Examples 1 to 7 had neither an exothermic peak showing crystallization at the time of cooling after melting, nor an endothermic peak showing the melting of the crystals at the time of melting by re-heating after cooling of a melt, revealing that there was no crystallizable polymer was obtained. In contrast, the polymers obtained in Examples 1 to 4, respectively, had an exothermic peak or endothermic peak of not less than 5 J/g at the time of cooling after melting or at the time of re-heating and melting, thus showing excellent crystallinity.

Example 5

A white polymer was obtained in the same manner as in Example 2, except that 1.20 mmol of 2,5-di-n-propylphenol (prepared with reference to J. Chem. Soc. Chem. Comm. 584 (1974)) was used in place of 2,5-dimethylphenol. The results of analysis are shown in Table 2.

The polymer was subjected to NMR analysis (LA600 of JEOL, Ltd.) at 60° C. in 1,2-dichlorobenzene-d4, and peaks were observed at 0.81 ppm (6H, t), 1.56 ppm (4H, q), 2.55 ppm (4H, t), and 6.74 ppm (2H, s), for 1H-NMR (600 MHz) and at 13.8 ppm, 23.4 ppm, 32.2 ppm, 119.7 ppm, 132.3 ppm, and 151.0 ppm, for 13C-NMR (150 MHz). From the above, it was found that the polymer had, as recurring units, the 2,5-di-n-propyl-1,4-phenylene oxide structure. Moreover, the results of Table 2 reveal that the polymer exhibits the desired crystallinity.

Example 6

A white polymer was obtained in the same manner as in Example 5, except that the reaction time was changed to 72 hours. The results of analysis of the polymer are shown in Table 2.

A comparison of the respective results of Examples 5 and 6 in Table 2 shows that a polymer having a larger molecular weight could be obtained by lengthening the reaction time. Thus, when the time of polymerization, the temperature of polymerization, the amount of a catalyst, or the concentration of the monomer is adjusted, a polymer having a larger molecular weight is obtained.

TABLE 1

| | Catalyst (mol % of metal relative to monomer) | Solvent | Reaction Temperature [° C.] | Reaction Time [hr] | Conversion [%] | Yield [%] | Solubility (oDCB/ 150° C.) | Mn (oDCB/ 140° C.) | Mw (oDCB/ 140° C.) | Tc [° C.] | Hc [J/g] | Tm [° C.] | Hm [J/g] |
|---|---|---|---|---|---|---|---|---|---|---|---|---|---|
| Example 1 | Cu(tacn) [0.5] | Toluene | 40 | 72 | 88 | 58 | Dissolved | 2600 | 4900 | 254 | 30 | 290 | 37 |
| Example 2 | Cu(tacn) [5] | Toluene | 40 | 24 | 99 | 78 | Dissolved | 3900 | 19300 | 242 | 13 | 303 | 23 |
| Example 3 | Cu(tacn) [0.5] | 1,2-Dichlorobenzene | 40 | 48 | 97 | 64 | Dissolved | 2700 | 6700 | 246 | 18 | 289 | 25 |
| Example 4 | Cu(tacn) [5] | Xylene | 40 | 24 | 85 | 69 | Dissolved | 2300 | 5800 | 255 | 32 | 291 | 38 |
| Comparative Example 1 | CuCl/tmed [5] | Chlorobenzene | 40 | 24 | 97 | 66 | Dissolved | 4900 | 17000 | N.D. (*2) | N.D. | N.D. | N.D. |
| Comparative Example 2 | CuCl/ 2,6-$Me_2$Py [5] | 1,2-Dichlorobenzene | 40 | 27 | 89 | 63 | Some insoluble matter | 6100 (*1) | 66100 (*1) | N.D. | N.D. | N.D. | N.D. |
| Comparative Example 3 | CuCl/n-$Pr_2$NH [5] | Isopropylalcohol | 30 | 3.5 | 62 | 35 | Dissolved | 3800 | 14300 | N.D. | N.D. | N.D. | N.D. |
| Comparative Example 4 | $CuCl_2$/ c-$HexNH_2$ [5] | Benzene/ ethanol | 30 | 1.2 | 95 | 40 | Dissolved | 3900 | 11400 | N.D. | N.D. | N.D. | N.D. |
| Comparative Example 5 | $MnCl_2$/t-BuOK [1] | Toluene /methanol | 40 | 25 | 80 | 52 | Some insoluble matter | 6500 (*1) | 15100 (*1) | N.D. | N.D. | N.D. | N.D. |
| Comparative Example 6 | Basic CuCl/py [~33] | Nitrobenzene | 30 | 8 | 99 | 61 | Some insoluble matter | 3100 (*1) | 11800 (*1) | N.D. | N.D. | N.D. | N.D. |
| Comparative Example 7 | $MnCl_2$/salea [10] | Benzene/ methanol | 30 | 8 | 79 | 51 | Some insoluble matter | 3000 (*1) | 9300 (*1) | N.D. | N.D. | N.D. | N.D. |

*1 measure dissolved matter only.
*2 "N.D." means no peak was observed.

Example 7

A white polymer was obtained in the same manner as in Example 2, except that 1.20 mmol of 2,5-di-isopropylphenol (prepared with reference to J. Chem. Soc. Part I, 959 (1960)) was used in place of 2,5-dimethylphenol and the reaction time was 30 hours. The results of analysis are shown in Table 2.

The polymer was subjected to NMR analysis (LA600 of JEOL, Ltd.) at 140° C. in 1,2-dichlorobenzene-d4, and peaks were observed at 1.20 ppm (12H, d), 3.38 ppm (2H, br), and 6.86 ppm (2H, s), for 1H-NMR (600 MHz), and at 22.6 ppm, 27.2 ppm, 116.5 ppm, 137.4 ppm, and 150.7 ppm, for 13C-NMR (150 MHz). From the above, it was found that the polymer had, as recurring units, the 2,5-di-isopropyl-1,4-phenylene oxide structure. Moreover, the results of Table 2 reveal that the polymer exhibits the desired crystallinity.

Example 8

A white polymer was obtained in the same manner as in Example 1, except that 1.20 mmol of 2-cyclohexyl-5-methylphenol (Honshu Chemical Industry) was used in place of 2,5-dimethylphenol and the reaction time was 96 hours. The results of analysis are shown in Table 2.

and 0.06 mmol of 2-methylphenol as a monomer for copolymerization were used in place of 2,5-dimethylphenol. The results of analysis are shown in Table 3. The results of Table 3 show that the copolymer exhibits the desired crystallinity.

Example 10

A white polymer was obtained in the same manner as in Example 2, except that 1.14 mmol of 2,5-dimethylphenol as the monomer and 0.06 mmol of 2-octadecylphenol as a co-monomer (prepared with reference to J. Am. Chem. Soc. 114, 1790 (1992)) were used. The results of analysis are shown in Table 3.

Example 11

A white polymer was obtained in the same manner as in Example 2, except that 1.08 mmol of 2,5-dimethylphenol as the monomer and 0.12 mmol of 2-octadecylphenol as a

TABLE 2

| | Monomer | Reaction Temperature [° C.] | Reaction Time [hr] | Conversion [%] | Yield [%] | Solubility (oDCB/ 150° C.) | Mn (oDCB/ 140° C.) | Mw (oDCB/ 140° C.) | Tc [° C.] | Hc [J/g] | Tm [° C.] | Hm [J/g] |
|---|---|---|---|---|---|---|---|---|---|---|---|---|
| Example 5 | 2,5-Di-n-propylphenol | 40 | 24 | 96 | 85 | Dissolved | 5000 | 12500 | 249 | 11 | 278 | 14 |
| Example 6 | 2,5-Di-n-propylphenol | 40 | 72 | 100 | 92 | Dissolved | 8500 | 32200 | 247 | 6 | 273 | 15 |
| Example 7 | 2,5-Diisopropylphenol | 40 | 30 | 92 | 71 | Dissolved | 2300 | 3900 | 278 | 41 | 255 | 45 |
| Example 8 | 2-cyclohexyl-5-methylphenol | 40 | 96 | 83 | 46 | Dissolved | 1500 | 2200 | 229 | 15 | 315 | 26 |

Example 9

A white polymer was obtained in the same manner as in Example 2, except that 1.14 mmol of 2,5-dimethylphenol co-monomer were used. The results of analysis are shown in Table 3.

Example 12

TABLE 3

| | Monomer (mol %/ mol %) | Reaction Temperature [° C.] | Reaction Time [hr] | Conversion of 2,5-dimethyl phenol [%] | Conversion of monomer for copolymerization [%] | Yield [%] | Solubility (oDCB/ 150° C.) | Mn (oDCB/ 140° C.) | Mw (oDCB/ 140° C.) | Tc [° C.] | Hc [J/g] | Tm [° C.] | Hm [J/g] |
|---|---|---|---|---|---|---|---|---|---|---|---|---|---|
| Example 9 | 2,5-Dimethylphenol/ 2-methylphenol (95/5) | 40 | 24 | 99 | 92 | 78 | Dissolved | 4000 | 14100 | 239 | 6 | 297 | 13 |
| Example 10 | 2,5-Dimethylphenol/ 2-octadecylphenol (95/5) | 40 | 24 | 99 | 81 | 86 | Dissolved | 4000 | 15800 | 238 | 12 | 299 | 19 |
| Example 11 | 2,5-Dimethylphenol/ 2-octadecylphenol (90/10) | 40 | 24 | 100 | 85 | 84 | Dissolved | 4600 | 17800 | 243 | 7 | 281 | 14 |

TABLE 3-continued

|  | Monomer (mol %/ mol %) | Reaction Temperature [° C.] | Reaction Time [hr] | Conversion of 2,5-dimethyl phenol [%] | Conversion of monomer for copolymerization [%] | Yield [%] | Solubility (oDCB/ 150° C.) | Mn (oDCB/ 140° C.) | Mw (oDCB/ 140° C.) | Tc [° C.] | Hc [J/g] | Tm [° C.] | Hm [J/g] |
|---|---|---|---|---|---|---|---|---|---|---|---|---|---|
| Example 12 | 2,5-Dimethylphenol/ bisphenol A (95/5) | 40 | 24 | 99 | 84 | 74 | Some insoluble matter | 2700 (*1) | 10400 (*1) | 223 | 3 | 287 | 11 |

*1 measure dissolved matter only.

A white polymer was obtained in the same manner as in Example 2, except that 1.14 mmol of 2,5-dimethylphenol as the monomer and 0.06 mmol of bisphenol A as a co-monomer were used. The results of analysis are shown in Table 3.

Reference Example

A monomer conversion after 24 hours was found to be 65% according to the polymerization conducted in the same manner as in Example 1, except that the monomer was changed to 1.2 mmols of 2,6-dimethylphenol. Aftertreatment was conducted in the same manner as in Example 1, to obtain red 2,2',6,6'-tetramethyldi-phenoquinone alone, as a methanol-insoluble matter at a yield of 25%.

Despite that such a catalyst as used in Example 1 was employed to obtain poly(2,5-dimethyl-1,4-phenylene oxide) from 2,5-dimethylphenol, no poly(2,6-dimethyl-1,4-phenylene oxide) was obtained from 2,6-dimethylphenol, revealing that the behaviors on polymerization, of 2,5-dimethylphenol and 2,6-dimethylphenol, completely differed from each other.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A crystallizable poly(2,5-di-substituted-1,4-phenylene oxide), which exhibits an exothermic peak for crystallization of 200 J/g to 5 J/g at 150° C. or over when cooled after melting, and/or an endothermic peak, at the time of melting of crystals thereof, of 200 J/g to 5 J/g at 150° C. or over when reheated after cooling, and which comprises a recurring unit of the following formula (I)

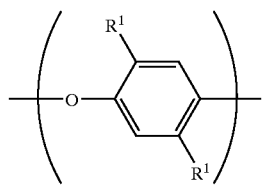

(I)

wherein $R^1$'s independently represent a hydrocarbon group or a substituted hydrocarbon group, and two $R^1$'s may be he same or different.

2. The crystallizable poly(2,5-di-substituted-1,4-phenylene oxide) as claimed in claim 1, which exhibits an exothermic peak for crystallization of not less than 5 J/g at 150° C. or over when cooled after melting, and an endothermic peak, at the time of melting of crystals thereof, of not less than 5 J/g at 150° C. or over when reheated after cooling.

3. The crystallizable poly(2,5-di-substituted-1,4-phenylene oxide) as claimed in claim 1, which is substantially free of gel substance.

4. The crystallizable poly(2,5-di-substituted-1,4-phenylene oxide) as claimed in claim 1, wherein the quantity of heat at the exothermic peak for crystallization is not lower than 10 J/g.

5. The crystallizable poly(2,5-di-substituted-1,4-phenylene oxide) as claimed in claim 1, wherein the quantity of heat at the endothermic peak for melting of crystals thereof is not lower than 10 J/g.

6. The crystallizable poly(2,5-di-substituted-1,4-phenylene oxide) as claimed in claim 1, wherein the number average molecular weight thereof ranges from 500 to 1,000,000.

7. The crystallizable poly(2,5-di-substituted-1,4-phenylene oxide) as claimed in claim 1, wherein $R^1$ is selected from the group consisting of an alkyl group having from 1 to 30 carbon atoms, an aralkyl group having from 7 to 30 carbon atoms, and an aryl group having from 6 to 30 carbon atoms.

8. The crystallizable poly(2,5-di-substituted-1,4-phenylene oxide) as claimed in claim 7, wherein $R^1$'s represent alkyl groups having from 1 to 6 carbon atoms.

9. The crystallizable poly(2,5-di-substituted-1,4-phenylene oxide) as claimed in claim 7, wherein $R^1$'s represent methyl groups, n-propyl groups, or isopropyl groups.

10. The crystallizable poly(2,5-di-substituted-1,4-phenylene oxide) as claimed in claim 1, wherein the recurring units represented by the formula (I) are present in n amount of not less than 80 unit %, based on the total number of recurring units.

11. The crystallizable poly(2,5-di-substituted-1,4-phenylene oxide) as claimed in claim 1, wherein $R^1$'s represent methyl group, n-propyl group, isopropyl group, or cyclohexyl group.

12. The crystalline poly(2,5-di-substituted-1,4-phenylene oxide) of claim 1, wherein the crystalline poly(2,5-di-substituted-1,4-phenylene oxide) exhibits an endothermic peak, at the time of melting of crystals thereof, of not less than 5 J/g at 150° C. or over when reheated after cooling.

13. The crystalline poly(2,5-di-substituted-1,4-phenylene oxide) of claim 1, wherein the crystalline poly(2,5-di-substituted-1,4-phenylene oxide) exhibits an exothermic peak for crystallization of not less than 5 J/g at 150° C. over when cooled after melting, and the endothermic peak, at the time of melting of crystals thereof, of not less than 5 J/g at 150° C. or over when reheated after cooling.

14. A crystallizable poly(2,5-di-substituted-1,4-phenylene oxide), which is substantially free of a gel substance and exhibits an exothermic peak for crystallization of not less than 5 J/g at 150° C. or over when cooled after melting, and an endothermic peak, at the time of melting of crystals thereof, of not less than 5 J/g at 150° C. or over when re-heated after cooling, and which comprises a recurring unit of the following formula (I)

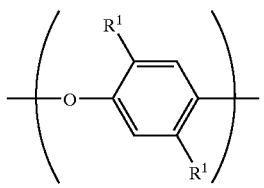

(I)

wherein R¹'s independently represent a hydrocarbon group or a substituted hydrocarbon group, and two R¹'s may be the same or different.

15. The crystallizable poly(2,5-di-substituted-1,4-phenylene oxide) of claim 1, wherein the exothermic peak temperature is between 150° C. and 500° C. and the endothermic peak temperature is between 150° C. and 500° C.

16. The crystallizable poly(2,5-di-substituted-1,4-phenylene oxide) of claim 1, wherein the recurring units represented by formula (I) are present in an amount not less than 95 unit %, based on the total number of recurring units.

17. A crystallizable poly(2,5-di-substituted-1,4-phenylene oxide), which exhibits an exothermic peak for crystallization of 200 J/g to 5 J/g at 150° C. or over when cooled after melting, and/or an endothermic peak, at the time of melting of crystals thereof, of 200 J/g to 5 J/g at 150° C. or over when re-heated after cooling, and which consists essentially of a recurring unit of the following formula (I)

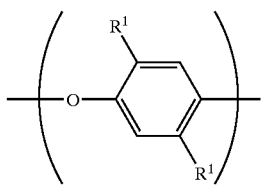

(I)

wherein R¹'s independently represent a hydrocarbon group or a substituted hydrocarbon group, and two R¹'s may be the same or different.

18. The crystallizable poly(2,5-di-substituted-1,4-phenylene oxide) as claimed in claim 17, which exhibits an exothermic peak for crystallization of not less than 5 J/g at 150° C. or over when cooled after melting, and an endothermic peak, at the time of melting of crystals thereof, of not less than 5 J/g at 150° C. or over when reheated after cooling.

19. The crystallizable poly(2,5-di-substituted-1,4-phenylene oxide) as claimed in claim 17, which is a substantially free of gel substance.

20. The crystallizable poly(2,5-di-substituted-1,4-phenylene oxide) as claimed in claim 17, wherein the quantity of heat at the exothermic peak for crystallization is not lower than 10 J/g.

21. The crystallizable poly(2,5-di-substituted-1,4-phenylene oxide) as claimed in claim 17, wherein the quantity of heat at the endothermic peak for melting of crystals thereof is not lower than 10 J/g.

22. The crystallizable poly(2,5-di-substituted-1,4-phenylene oxide) as claimed in claim 17, wherein the number average molecular weight thereof ranges from 500 to 1,000,000.

23. The crystallizable poly(2,5-di-substituted-1,4-phenylene oxide) as claimed in claim 17, wherein R¹ is selected from the group consisting of an alkyl group having from 1 to 30 carbon atoms, an aralkyl group having from 7 to 30 carbon atoms, and an aryl group having from 6 to 30 carbon atoms.

24. The crystallizable poly(2,5-di-substituted-1,4-phenylene oxide) as claimed in claim 23, wherein R¹'s represent alkyl groups having from 1 to 6 carbon atoms.

25. The crystallizable poly(2,5-di-substituted-1,4-phenylene oxide) as claimed in claim 23, wherein R¹ s represent methyl groups, n-propyl groups, or isopropyl groups.

26. The crystallizable poly(2,5-di-substituted-1,4-phenylene oxide) as claimed in claim 17, wherein the recurring units represented by the formula (I) are present in an amount of not less than 80 unit %, based on the total number of recurring units.

27. The crystallizable poly(2,5-di-substituted-1,4-phenylene oxide) as claimed in claim 17, wherein R¹'s represent methyl group, n-propyl group, isopropyl group, or cyclohexyl group.

28. The crystallizable poly(2,5-di-substituted-1,4-phenylene oxide) of claim 17, wherein the crystalline poly(2,5-di-substituted-1,4-phenylene oxide) exhibits an endothermic peak, at the time of melting of crystals thereof, of not less than 5 J/g at 150° C. or over when reheated after cooling.

29. The crystallizable poly(2,5-di-substituted-1,4-phenylene oxide) of claim 17, wherein the crystalline poly(2,5-di-substituted-1,4-phenylene oxide) exhibits an exothermic peak for crystallization of not less than 5 J/g at 150° C. over when cooled after melting, and the endothermic peak, at the time of melting of crystals thereof, of not less than 5 J/g at 150° C. or over when reheated after cooling.

30. The crystallizable poly(2,5-di-substituted-1,4-phenylene oxide) of claim 17, wherein the exothermic peak temperature is between 150° C. and 500° C. and the endothermic peak temperature is between 150° C. and 500° C.

31. The crystallizable poly(2,5-di-substituted-1,4-phenylene oxide) of claim 17, wherein the recurring units represented by formula (I) are present in an amount not less than 95 unit %, based on the total number of recurring units.

* * * * *